Patented Apr. 27, 1948

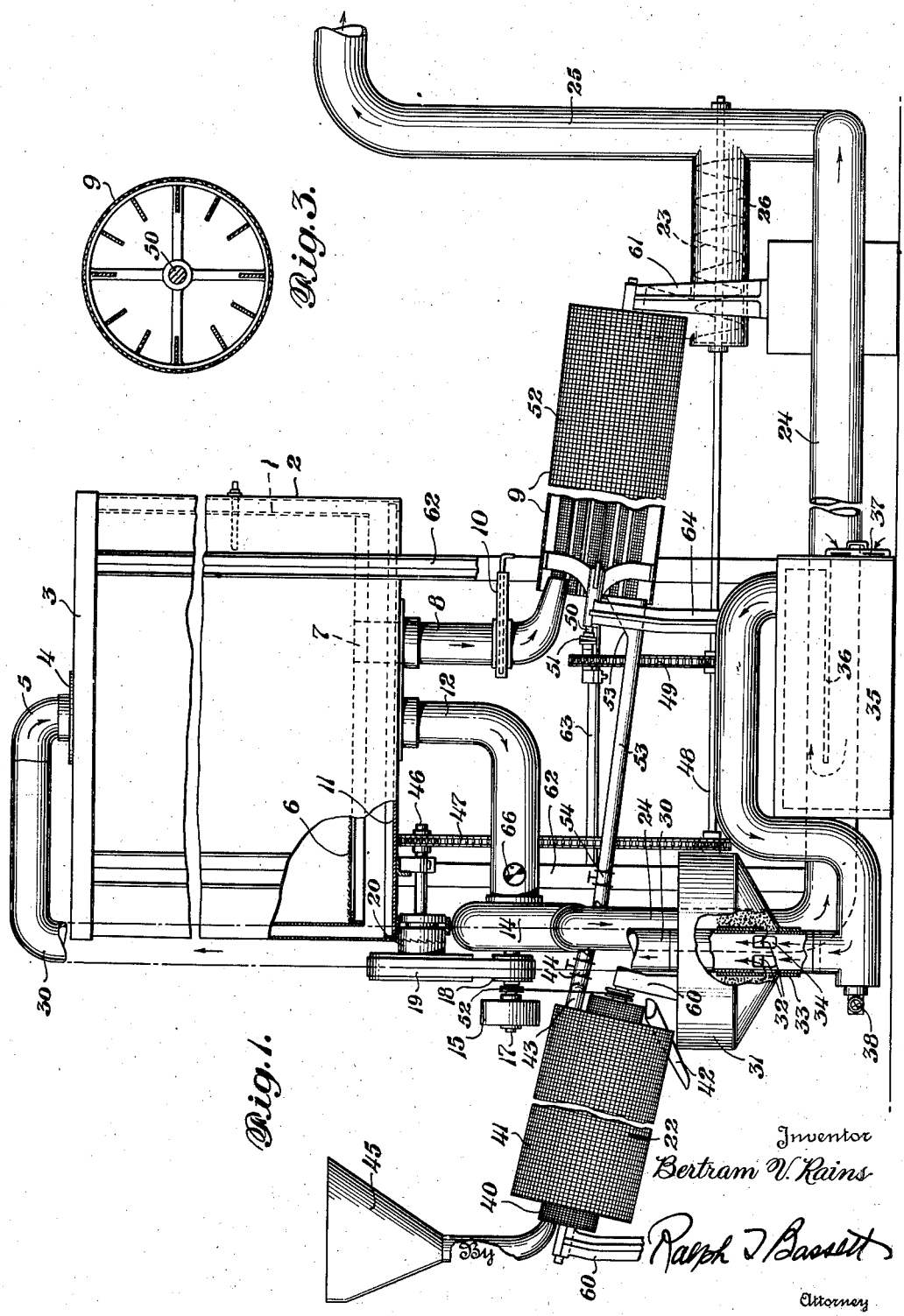

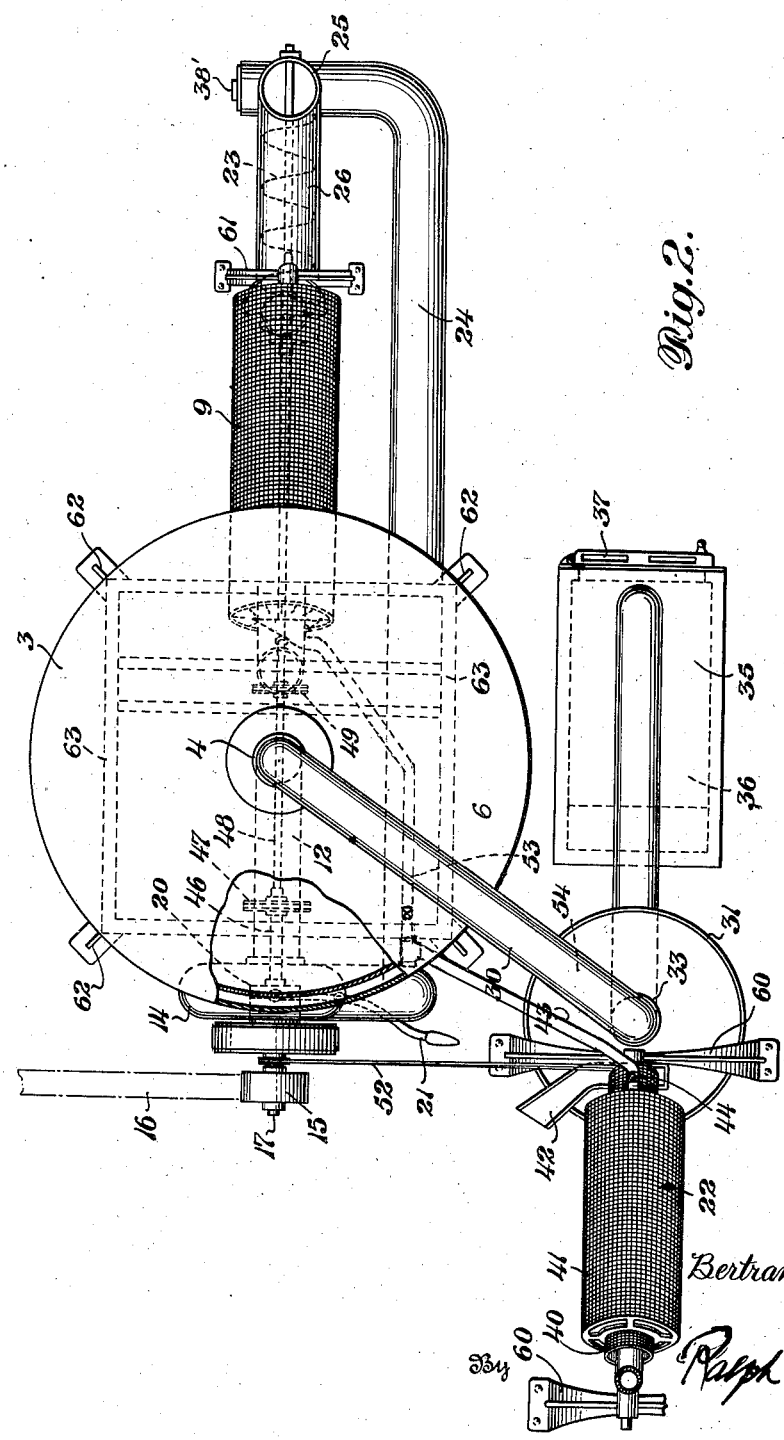

2,440,524

UNITED STATES PATENT OFFICE 2,440,524

COMBINED CLEANER, DRIER, AND GRAINERY

Bertram V. Rains, Raymondville, Tex.

Application December 23, 1943, Serial No. 515,461

12 Claims. (Cl. 209—10)

This invention relates to improvements in an apparatus for cleaning, drying and storing grains of various kinds.

The main purpose of the present development is to provide an assembly by means of which it will be practical to clean, dry and store grain in relatively small quantities in localities not readily accessible to the larger bins and storage depots, and thus not only reduce the demands on such establishments, but also avoid unnecessary haulage expense, incurred by the use of grain distributing systems which include only large and widely spaced bins.

One of the objects of this invention is to provide a combined unit with a single power plant for the drying, storing and cleaning of the grain.

Another object is to provide a unit in which the stored grain will always be accessible for handling, including sacking and shipping.

Other objects, such as the provision of a readily portable unit, accurate control of drying and storing temperatures, and regulation of the grain flow, both in the charging and discharging of the bin are accomplished by means of the invention described and claimed in the following specification, and shown in the attached drawing, forming a part of this specification wherein like characters of reference designate corresponding parts throughout the several views, in which Fig. 1 is a side elevation, partly in section, Fig. 2 is a top plan view, and Fig. 3 is a transverse section of the discharging screen.

In the assembly comprising this invention there are several essential structures so constructed and arranged as to cooperate to perform the several functions of the development. Among these structures the storage bin centers, this being of such size and shape as may be necessary in the particular locality in which it is situated to care for the available grain production. The bin illustrated in the drawings is cylindrical in shape and includes inner and outer side walls 1 and 2, suitably spaced to provide proper insulation and moisture proofing and to facilitate any grain treating processes desired. The side walls are capped as at 3, the cap 3 having a central opening flanged at 4 for connection with the intake elbow 5 as shown. The bottom of the inner wall 1 is closed by a screen 6 except at the discharge outlet 7 which is connected to pipe 8 communicating with the cooling screen 9 and controlled by valve 10. The outer wall 2 is closed by the solid bottom 11, through which the grain outlet pipe 8 passes, and connected to which is the air outlet duct 12 forming the communication between the bin and the blower 14 as will hereinafter more clearly appear. The blower 14 is of any conventional type and of a size to produce necessary suction for moving the grain and supplying auxiliary jets of air for cleaning, drying and cooling the grain during transit. Power is supplied to the blower by any suitable means, however, for purposes of illustration the pulley 15 and belt 16 are shown, with the pulley shaft 17 forming the rotor mount of the blower. A take-off pulley 18 is mounted on the shaft 17 and through belt 19, clutch 20, and clutch control lever 21 supply necessary power to the drying screen 22, cooling screen 9 and feed screw 23.

The air outlet duct 12 forms the air inlet to the blower 14 and from the blower 14 the air passes through the duct 24 and upwardly through the discharge pipe 25 to a source of delivery. A short pipe 26 opens into the discharge 25 and the delivery screw 23 in this pipe forces the grain into the path of movement of the air in pipe 25 from the blower.

The air in the bin formed by the walls 1 and 2 is supplied by the duct 30, which is connected to the grain intake elbow 5 at the top of the bin. This duct 30 extends vertically downward through the center of the cylindrical hopper 31 and has variable ports 32 through which the grain in the bin is drawn by the movement of air through the duct 30, bin 1 duct 12 and blower 14. A sleeve 33 carried by the hopper 31 is concentrically mounted on the duct 30, and the ports 34 of the sleeve are movable with respect to the ports 32 of the duct 30 to permit this duct variation.

An air heater 35 of any suitable type is connected to the duct 30 posterior to the grain hopper. This heater includes a suitable number of baffles 36 to zigzag the air movement adjacent the heat source as is conventional in such structures. An air inlet 37 in the air heater 35 furnishes the supply of air and this supply is varied by suitably positioned valved ports as at 38 to modify the air temperature. The valve 38 at the elbow of the duct leaving the heater 35, permits the regulation of air temperature when the heater is in operation by the addition of outside air into the duct 30. The regulation of the temperature is of vital importance in the storing of grain.

The grain to be stored is first cleaned and dried by means of the revolving cylindrical screens 40 and 41, the inner screen 40 being of relatively coarse mesh first receiving the grain and separating the stalk and other rubbish therefrom which passes out of the end of the inner screen onto the chute 42 for disposal. The grain passes through the inner screen 40 onto the outer screen 41, and is further cleaned by this outer screen which permits escape of finer particles of dirt which have not been blown from the falling and rotating grain by virtue of a blast of hot air from the air feed pipe 43 which is directed into and through the screen cylinders. The pipe 43 is tapped into the fan discharge duct 24 and is controlled by a valve 44 although any other arrangement may be made whereby necessary hot air can be forced into the cleaning and drying screen to help prepare the grain by partially drying and cleaning. A hopper 45 forms the grain source for the cleaner and it is into this hopper that the grain is originally dumped.

The screen 9 is located to receive grain from the valved bin discharge 8, and this screen is provided with a multiplicity of longitudinally extending internal vanes or fins to agitate the screen during cooling operation, when delivery is being made from the bin when the grain therein is in heated condition, as for instance when a drying operation is in progress. The cooling screen 9 is rotated by means of power from source 15 through belt 19, clutch 20, shaft 46, chain drive 47, shaft 48, chain 49, universal joint 51 and shaft 50. A belt drive 51 from the pulley 52' on shaft 17 is used to drive the screens 40 and 41 as best shown in Figure 1. To facilitate the cooling operation a blast of cool air is forced into the cooling screen from a duct 53 connected to the fan discharge duct. The duct 52 has a control valve 54 and an enlarged head 55 which opens into the cooling screen in a manner to provide maximum contact of the air with the grain.

The grain discharging from the cooling screen 9 discharges into the screw chamber 26 where the screw 23 causes the discharge of same into the air train for delivery through the duct 25. The screw 23 is driven from the same source of power as the other parts by means of shaft 48 on the outer end of which it is mounted.

All of the parts heretofore described are supported upon suitable framing of a character to permit quick dissembly and to provide a generally portable assembly. The standards indicated at 60 are for supporting each end of the drying cylinder and a similar standard 61 is used at the outer end of the cooling cylinder. The bin is mounted on vertical framing as at 62, and this framing is braced by horizontal struts 63 both at the top and bottom. A vertical standard 64 extends upwardly from the struts 63 and forms the supporting means for the inner end of the cooling chamber. Other supports and braces may be utilized where necessary to secure the needed rigidity for satisfactory service.

In operation the blower 14 is started and suitable heat is provided at the fire-box 35. Grain from the hopper 45 is discharged into the inner cleaning screen 40 and the rough dirt therefrom discharged into the trough 42. The grain passes through the coarse mesh of the inner cylinder 40 into the outer cylinder 41 where further discharge of dirt is accomplished through the screening. In the meantime heated air is blasted into the rapidly moving grain through valve controlled pipe 43 which gives a preliminary drying action and also blows the loose dirt from the grain.

The supply of fresh air is available at two points, namely by use of the valve 38 and the air inlet 66. The air inlet 38 provides a temperature control for the duct feeding the grain by suction into the housing while the air inlet 66 supplies fresh air into the air discharge pipe 12 of the housing, this pipe or duct 12 from the housing being the pump inlet. Thus it will be obvious that with the air control ports 38 and 66 the cooling or control of the air temperature is available at all times to the grain in its movement into and out of the housing and also to the grain while in the housing. As stated above this regulation of temperature is essential in connection with the control of condensation and regulation of drying temperatures to perform the desired functions.

From the outer screen 41 the grain discharges into the hopper 31 and is caught by the suction in the pipe and pulled through the ports 32, 34 and discharged by the duct 30 into the bin. The grain is supported in the bin on the screen bottom 6 and the hot air continues to circulate therethrough by virtue of the blower connection 12 which is tapped into the bin base. This operation continues until the bin is full or the supply stored. The temperature of the air in the system upon loading of the bin is regulated by opening the stove air inlet 37 or the air inlets 38 and 66.

When grain is discharging from the housing 1 through the screen 52, simultaneously with the loading of the housing through pipe 30, the temperature of the discharged grain is reduced by supplying air through the pipe 53. The temperature of this air is reduced by control of the air inlet 66. It will be apparent that where the loading and unloading of the housing is being performed simultaneously that it is not entirely practical to supply air at atmospheric temperature through the pipe 53 because of the heat from the stove 35. However, the temperature of the heated air is substantially reduced and modified by opening valves 38 and 66 so that there is a proportionate reduction of the temperature in the discharging grain. This will naturally result in a lower drying operation in the housing because of the lower temperature, however, this temperature can be increased after the discharging operation is completed. As much atmospheric air will be admitted into the cycle as is practical to insure a proper conditioning of the discharged or loaded grain and at the same time perform in part, at least, the drying operation to the grain being delivered through inlet pipe 30 to the storage chamber.

To unload the grain from the bin the valve 10 is opened, the cooling screen 9 revolved, and the feed screw 23 is rotated. The operations take place with the blower in operation, and the fresh air inlet 66 of the blower open. Also a cooling blast from the blower is forced through the cooling screen 9 through outlet 53 connecting with the fan discharge. The grain from the cooling screen discharges into the screw or auger casing 26 where it is carried into the discharge pipe 25 under air pressure from the blower.

All of the adjustments are variable so that pressures and temperatures can be maintained to secure satisfactory operation. Obviously, more power, more suction, more pressure and more temperature will be required under varying conditions.

I claim:

1. In a combined grainery and drier including a housing for grain to be stored, a blower, a first duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying heated air to said cleaning and drying apparatus under pressure, a grain cooling apparatus, means for supplying air from said blower to said cooling apparatus, and means for discharging a regulated quantity of grain from said housing to said cooling apparatus.

2. In a combined grainery and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying heated air to said cleaning and drying apparatus under pressure, a grain cooling apparatus, means for supplying air to said blower, and means for forcing the cooled air from said blower to said cooling apparatus, means for discharging a regulated quantity of grain from said housing to said cooling apparatus, and a single source of power for operating said blower and cleaning and drying apparatus.

3. In a combined grainer and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying a portion of the heated air from the inlet duct to said cleaning and drying apparatus under pressure, a grain cooling apparatus, means for supplying air to said blower, and means for feeding the cooled air from said blower to said cooling apparatus, means for discharging a regulated quantity of grain from said housing to said cooling apparatus, and a single source of power for operating said blower, cleaning and drying apparatus and cooling apparatus.

4. In a combined grainery and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying heated air from said inlet duct to said cleaning and drying apparatus under pressure, a grain cooling apparatus, means for supplying air to said blower, and means feeding said cooled air from said blower to said cooling apparatus, means for discharging a regulated quantity of grain from said housing to said cooling apparatus and means for supplying cool air to said blower for discharging into said cooling apparatus.

5. The substance of claim 1 characterized in that the cooling apparatus is operable independent of the cleaning and drying apparatus and the blower is operable to supply air to same when so operated.

6. In a combined grainery and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying the heated air from the inlet duct to said cleaning and drying apparatus under pressure, a grain cooling apparatus, means for supplying air to said blower, and means for feeding said cooled air from said blower to said cooling apparatus, means for discharging a regulated quantity of grain from said housing to said cooling apparatus, and screw means for discharging the grain from said cooling means.

7. In a combined grainery and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying heated air to said cleaning and drying apparatus under pressure, a grain cooling apparatus, means for supplying cool air to said blower, means for supplying air from said blower to said cooling apparatus, means for discharging a regulated quantity of grain from said housing to said cooling apparatus, and screw means for discharging grain from said cooling apparatus to a fluid conveyor operated by pressure from said blower.

8. In a combined grainery and drier including a housing for grain to be stored, a blower, a duct connecting said housing to the blower inlet, an inlet duct for supplying air to said housing, a heater for heating the air entering the inlet duct, means for supplying unheated air to the inlet duct, a hopper for discharging grain to said inlet duct for movement into said housing by suction from said blower, a grain cleaning and drying apparatus discharging into said hopper, means for supplying heated air to said cleaning and drying apparatus under pressure, a grain cooling apparatus, means for feeding cool air to said blower, means for supplying air from said blower to said cooling apparatus, means for discharging a regulated quantity of grain from said housing to said cooling apparatus, and screw means operable to discharge grain from said cooling apparatus, said screw means being operated from the source of power actuating said blower, at such times as when said drying and cleaning apparatus is inoperative.

9. In a combined grainery and drier including a housing for grain to be stored, a blower, a first duct connecting the inlet of said blower with the lower portion of said housing, an air heating apparatus, a second duct connecting the air heating apparatus with the upper portion of said housing, a hopper feeding grain into the last mentioned duct to permit movement of same to said housing by suction from said blower, a grain cleaning and drying apparatus discharging into said hopper, a pipe connected to the blower and opening into said cleaner and drier for feeding heated air from said second duct to said grain cleaner and drier, a discharge apparatus for said housing, means for feeding grain from said housing to said apparatus, a cooling apparatus for cooling said grain in its passage to said discharge apparatus, a fresh air inlet for the first named duct and a connection for feeding air from said blower to said cooling apparatus when said fresh air inlet is open.

10. In a combined grainery and drier including a housing for grain to be stored, a blower having an inlet and outlet, a duct connecting the inlet of said blower and said housing, an air heating apparatus, a duct connecting said heating apparatus and said housing and subjected to suction from said pump inlet through said housing, means for feeding grain to said duct connecting said heating apparatus and housing for movement to said housing by suction, a grain cooling screen, means for discharging grain from said housing to said screen, means for feeding air from said blower to said screen, means for feeding unheated air into the duct connecting said blower and housing, and means for moving the grain discharging from said screen by the exhaust from said blower.

11. In a combined grainery and drier including a housing for grain to be stored, a blower having inlet and discharge openings, a duct connecting said blower inlet and said housing, an air heating apparatus, a duct connecting said housing and said heating apparatus, and subjected to suction from said blower inlet through said housing, means for feeding grain to the duct connecting said housing and heating apparatus for movement to said housing by suction, a rotary grain cooling screen, means for feeding air from said blower to said screen, an air inlet in said duct connecting said housing and blower inlet, a duct having an upright discharge portion connected to the blower outlet, and a conveyor for discharging grain from said screen to said upright discharge at a point adjacent the end of its upright portion for movement by air current from said blower.

12. In a combined grainery and drier including a housing for the grain to be stored, a blower having inlet and discharge openings, a duct connecting said inlet and housing, a heating apparatus, a duct connecting the heating apparatus and housing and subjected to suction from said blower through said housing, means for feeding grain to the duct connecting said heating apparatus and housing for movement by suction to said housing, a rotary grain cooling screen, means for discharging grain in a regulated quantity from said housing to said screen, means for feeding air from said blower in said screen, means for regulating the temperature of the air moving into said housing, means for regulating the temperature of air discharging from said housing, a main discharge duct extending from said blower, an upright discharge portion for the last named duct, and means for delivering grain from said screen to said upright duct at a point adjacent its junction with the main duct.

BERTRAM V. RAINS.

REFERENCES CITED

The following references are of record in the file of this patent:

UNITED STATES PATENTS

| Number | Name | Date |
| --- | --- | --- |
| Re. 17,212 | Stockton | Feb. 12, 1929 |
| 113,219 | Stark et al. | Mar. 28, 1871 |
| 659,732 | Friedley et al. | Oct. 16, 1900 |
| 1,759,702 | Koon | May 20, 1930 |
| 2,082,555 | Smith | June 1, 1937 |
| 2,319,674 | French et al. | May 18, 1943 |
| 2,140,827 | Boag | Dec. 20, 1938 |